(12) United States Patent
Panejko et al.

(10) Patent No.: US 10,207,674 B2
(45) Date of Patent: Feb. 19, 2019

(54) METHOD FOR SETTING A SAFETY BELT AND ADJUSTING APPARATUS FOR A SAFETY BELT

(71) Applicant: Brose Fahrzeugteile GmbH & Co. KG, Coburg, Coburg (DE)

(72) Inventors: Hubert Panejko, Coburg (DE); Christian Herrmann, Coburg (DE); Wolfgang Uebel, Weitramsdorf (DE); Mario Stegerer, Gundelsheim (DE); Stefan Baetz, Meeder (DE); Maik Rienecker, Memmelsdorf (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 23 days.

(21) Appl. No.: 15/302,147

(22) PCT Filed: Mar. 18, 2015

(86) PCT No.: PCT/EP2015/055618
§ 371 (c)(1),
(2) Date: Mar. 21, 2017

(87) PCT Pub. No.: WO2015/154955
PCT Pub. Date: Oct. 15, 2015

(65) Prior Publication Data
US 2017/0217402 A1    Aug. 3, 2017

(30) Foreign Application Priority Data

Apr. 7, 2014  (DE) .................. 10 2014 206 671
May 30, 2014 (DE) .................. 10 2014 210 302

(51) Int. Cl.
*B60R 22/48*  (2006.01)
*B60R 22/20*  (2006.01)

(52) U.S. Cl.
CPC .............. *B60R 22/48* (2013.01); *B60R 22/20* (2013.01); *B60R 2022/208* (2013.01); *B60R 2022/485* (2013.01)

(58) Field of Classification Search
CPC ... B60R 22/48; B60R 22/20; B60R 2022/485; B60R 2022/208
See application file for complete search history.

(56) References Cited

U.S. PATENT DOCUMENTS 4,518,174 A * 5/1985 Sedlmayr .............. B60R 22/201
                                            280/801.2
4,616,850 A * 10/1986 Sedlmayr .............. B60R 22/201
                                            280/801.2
(Continued)

FOREIGN PATENT DOCUMENTS

DE      3146918 A1    6/1983
DE      3736056 A1    4/1989
(Continued)

OTHER PUBLICATIONS

Japanese Office action dated Oct. 9, 2018 issued in corresponding Japanese Application No. 2016-561369, 3 pages.

*Primary Examiner* — Darlene P Condra
(74) *Attorney, Agent, or Firm* — Lewis Roca Rothgerber Christie LLP

(57) ABSTRACT

A method for setting a safety belt in a vehicle is provided. For the adjustment of the safety belt an adjusting apparatus is provided, the position of a deflection point for the safety belt being able to be set thereby and the safety belt extending therefrom in the direction of the shoulder of a vehicle occupant fastened-in by the safety belt, and the position of the deflection point is automatically set by means of at least one sensor device in order to adapt the path of the safety belt to the fastened-in vehicle occupant. Via the sensor device an angle is evaluated which is present between a belt portion (Continued)

which extends from the deflection point in the direction of the shoulder of the fastened-in vehicle occupant and a further belt portion and/or a part fixed to the bodywork or seat part.

16 Claims, 19 Drawing Sheets

(56) References Cited

U.S. PATENT DOCUMENTS

| | | | | |
|---|---|---|---|---|
| 4,729,581 | A * | 3/1988 | Ono | B60R 22/20 200/61.58 B |
| 5,125,686 | A * | 6/1992 | Yano | B60R 22/201 280/801.2 |
| 5,261,698 | A * | 11/1993 | Yano | B60R 22/201 280/808 |
| 8,392,071 | B2 * | 3/2013 | Hashimoto | B60N 2/0276 701/45 |
| 2004/0155450 | A1 * | 8/2004 | Monroe | B60R 22/20 280/801.2 |
| 2008/0246318 | A1 | 10/2008 | Bothe et al. | |
| 2009/0261566 | A1 * | 10/2009 | Pelliccia | B60R 22/20 280/801.2 |
| 2015/0266448 | A1 * | 9/2015 | Aoki | B60R 22/20 297/313 |
| 2017/0291575 | A1 * | 10/2017 | Le | B60R 22/48 |

FOREIGN PATENT DOCUMENTS

| | | |
|---|---|---|
| DE | 8806059 U1 | 9/1989 |
| DE | 19812809 A1 | 11/1998 |
| DE | 10-2004-041152 A1 | 3/2006 |
| DE | 10-2008-060617 A1 | 6/2010 |
| DE | 10-2013-004830 A1 | 3/2014 |
| GB | 2323017 A | 9/1998 |
| JP | 60-139554 | 7/1985 |
| JP | 10-217908 | 8/1998 |
| WO | WO 97/33777 | 9/1997 |
| WO | WO 2005/090118 A1 | 9/2005 |

* cited by examiner

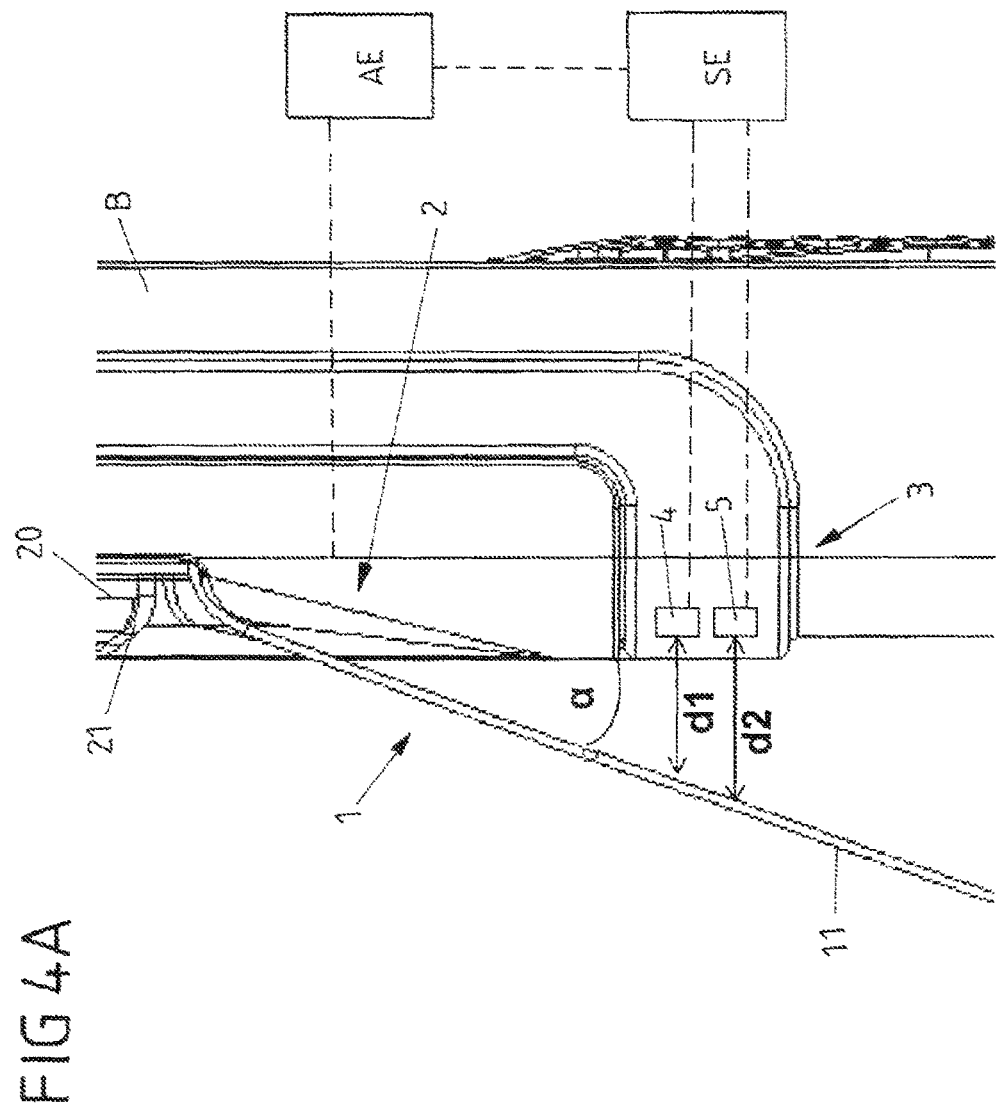

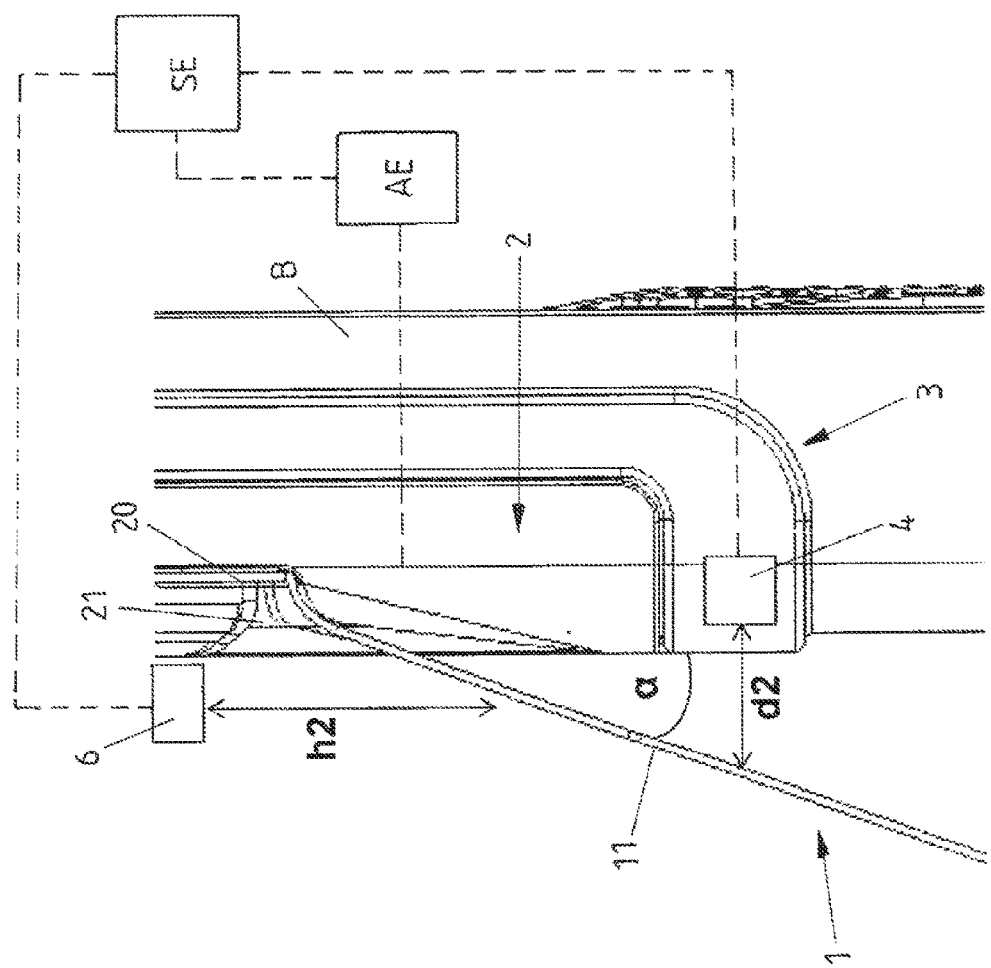

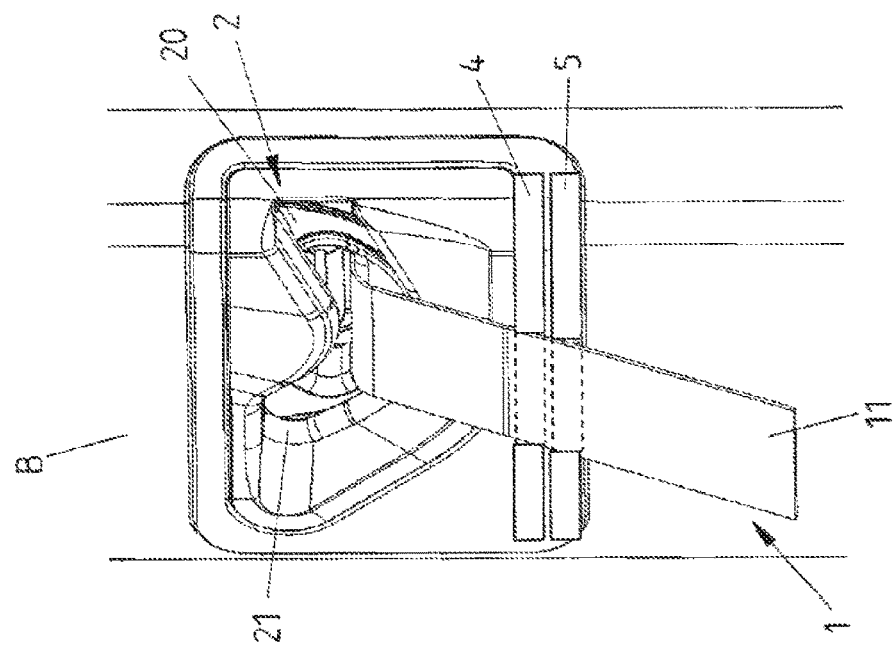
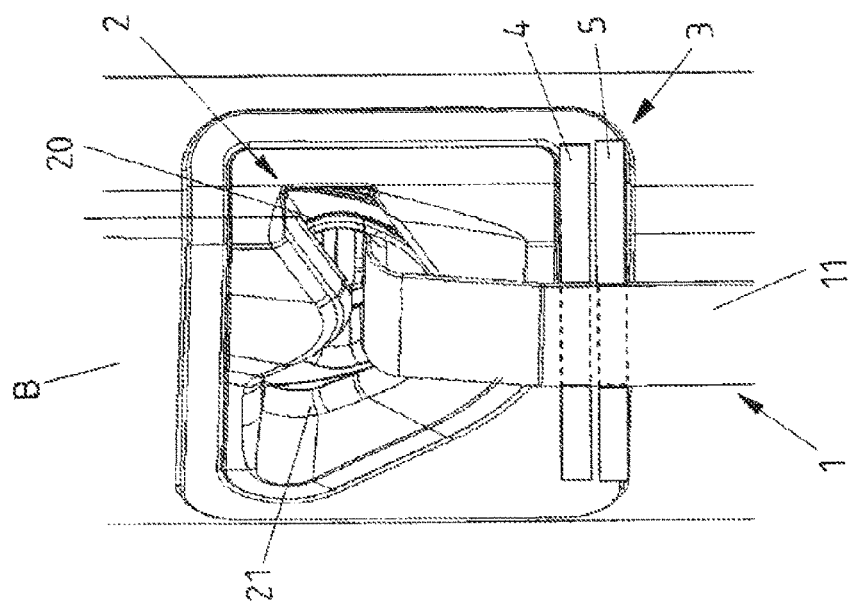

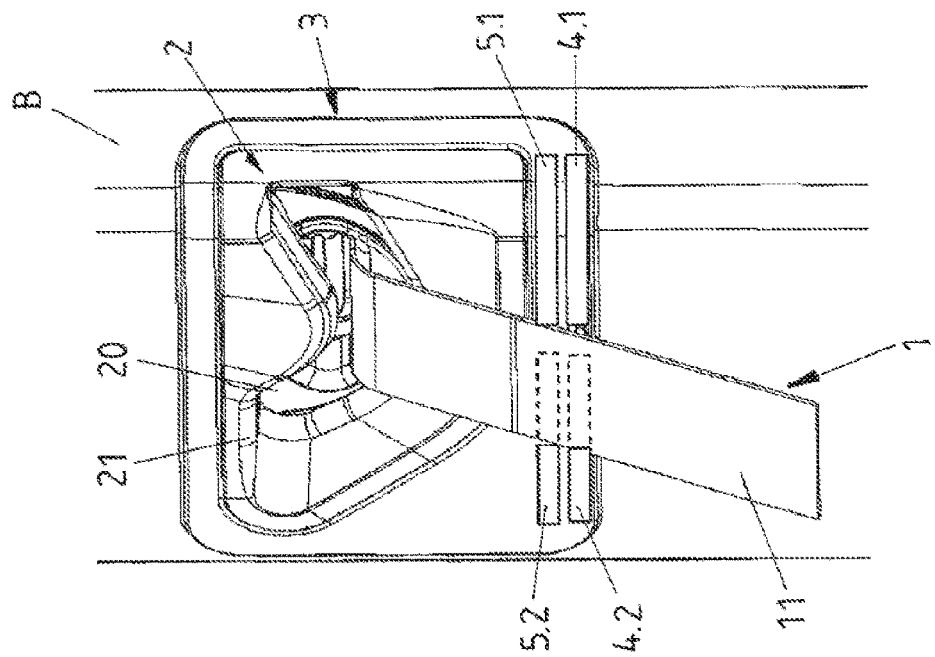
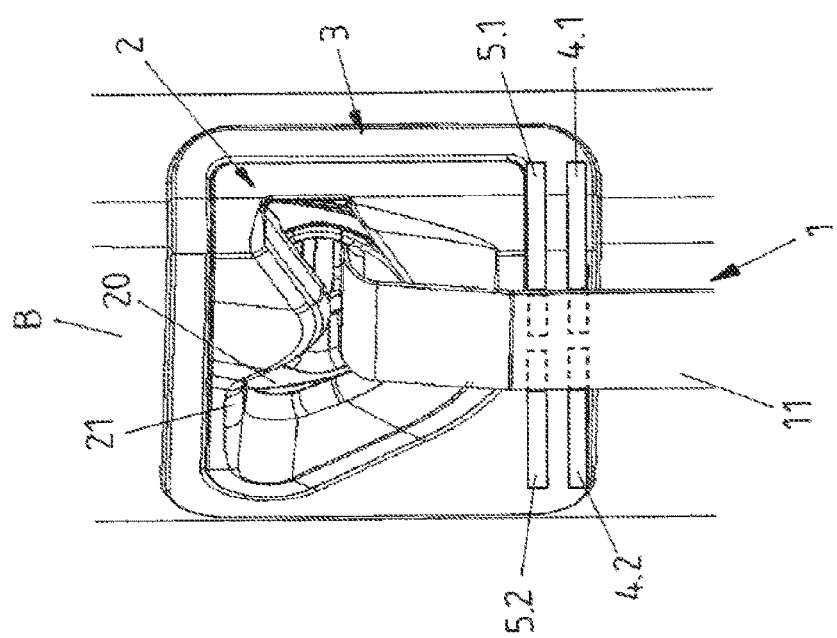

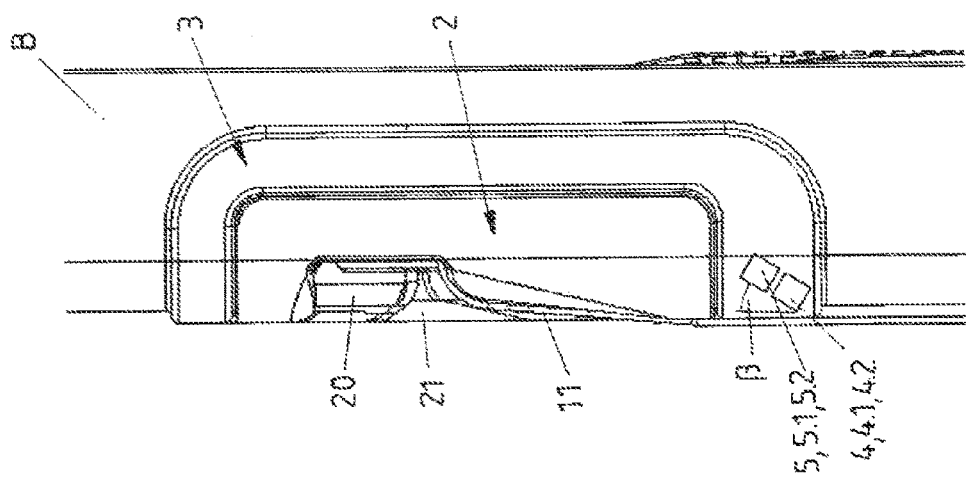
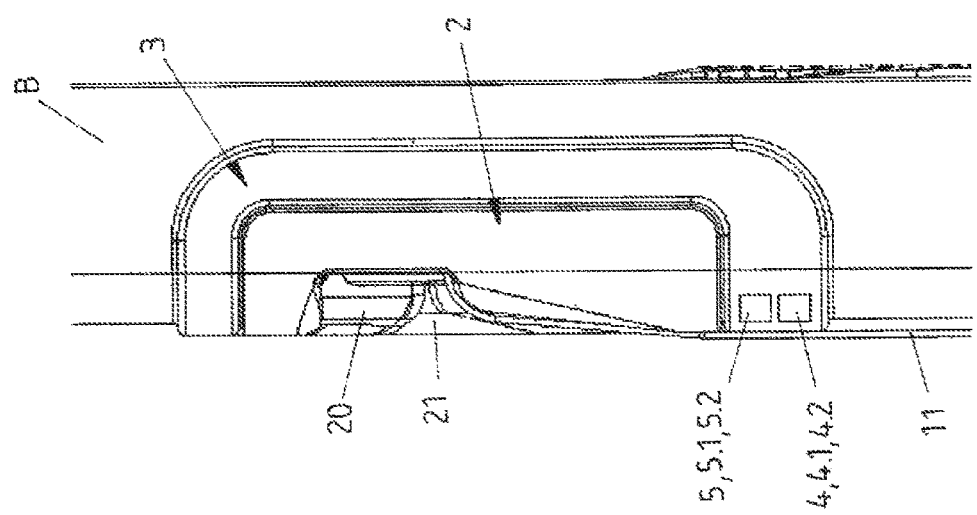

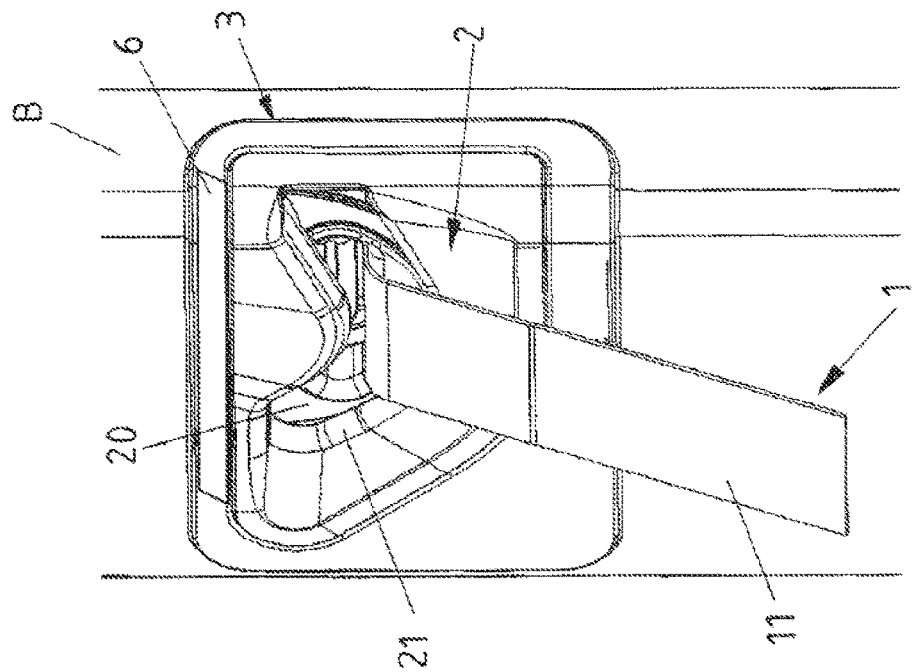
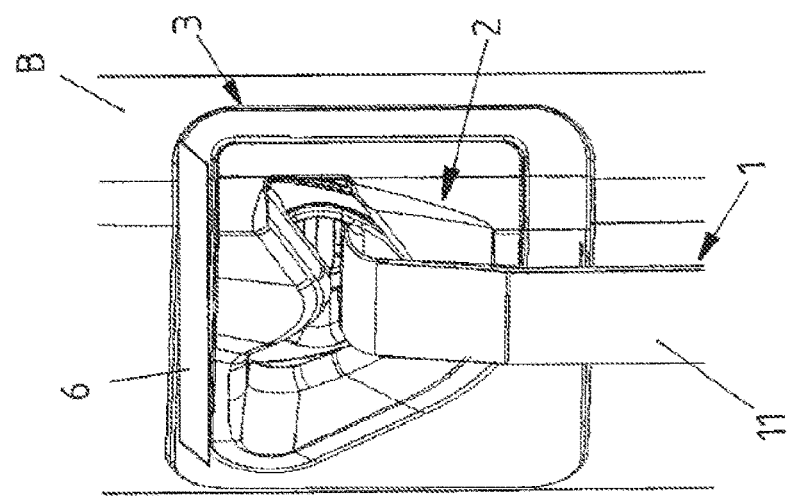

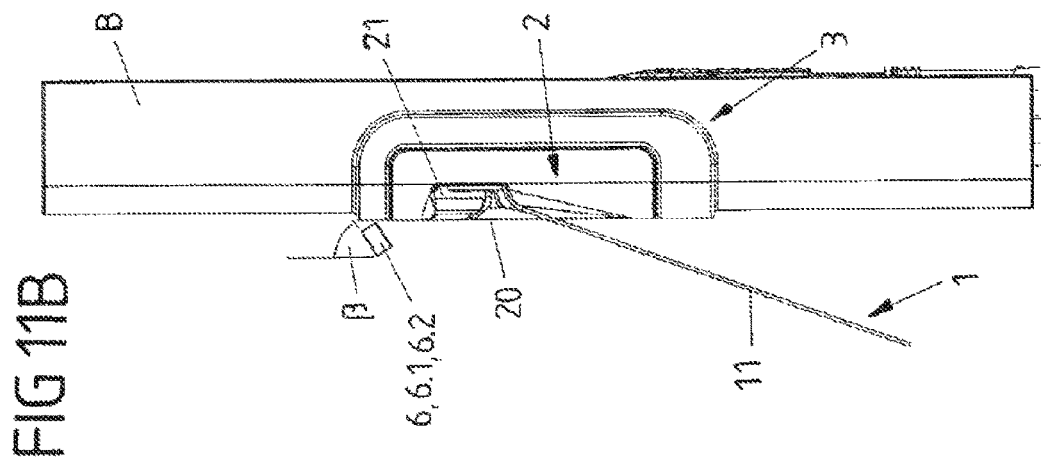
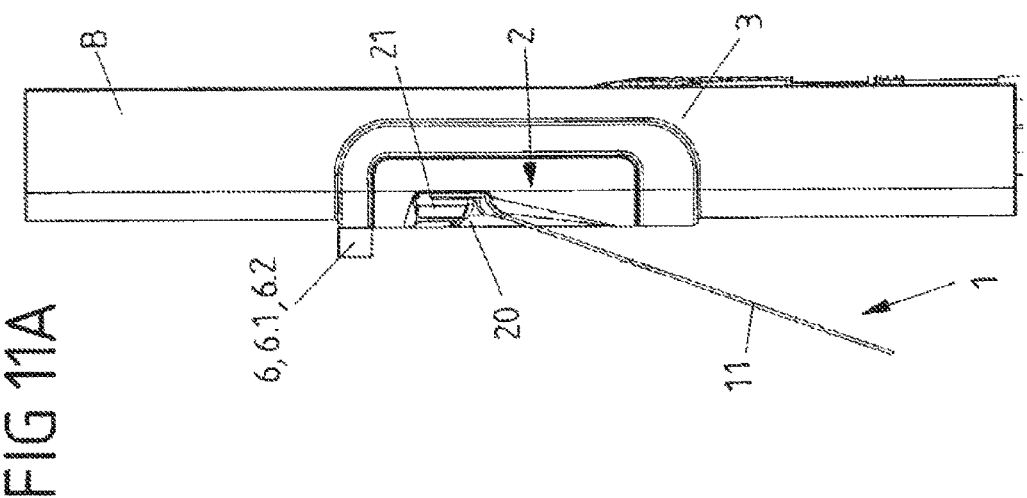

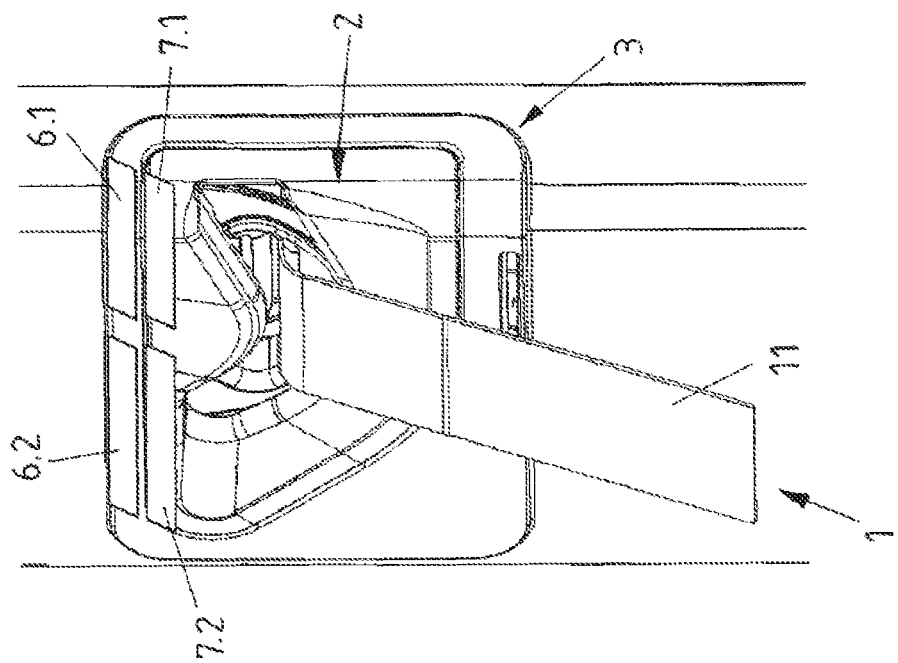
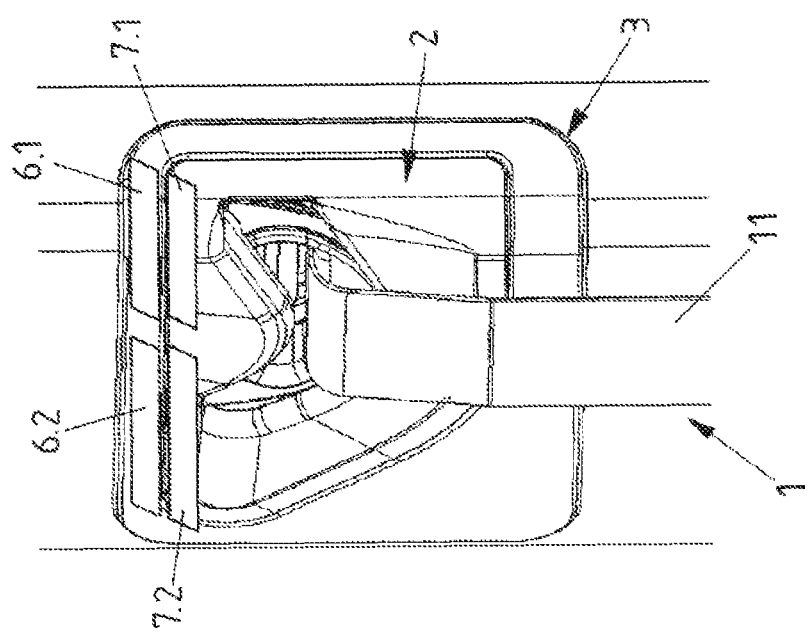

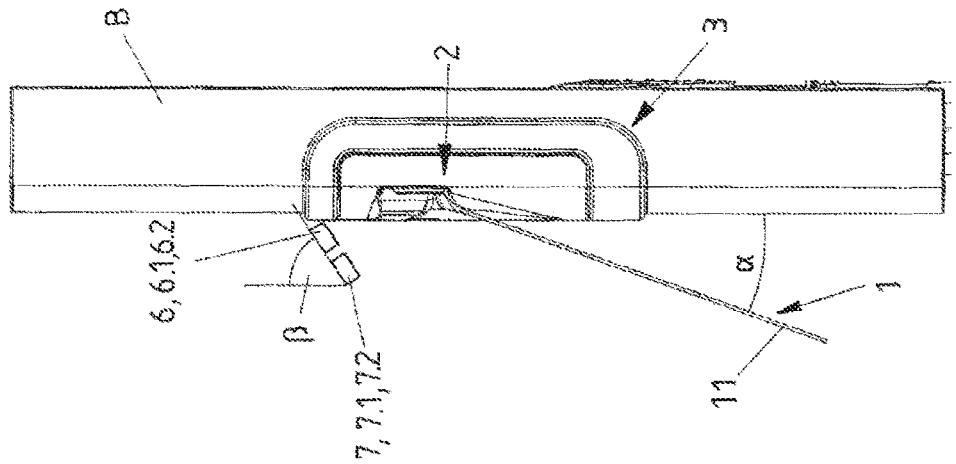
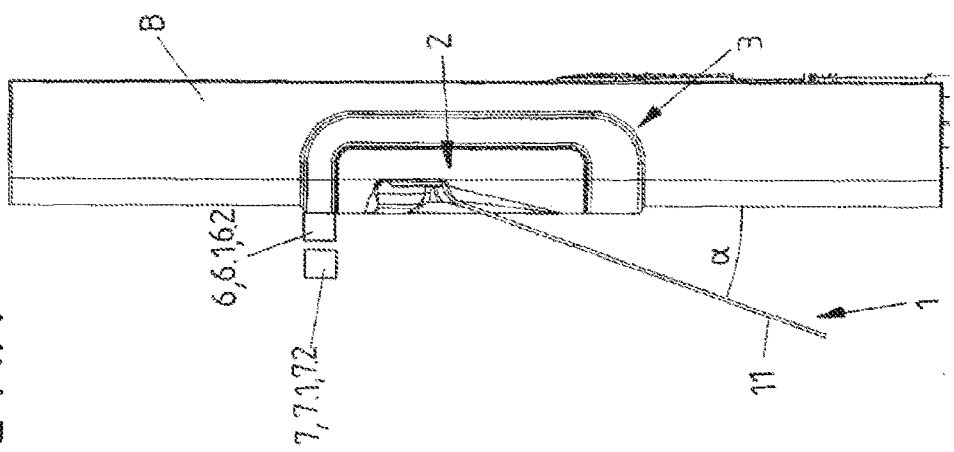

METHOD FOR SETTING A SAFETY BELT AND ADJUSTING APPARATUS FOR A SAFETY BELT

CROSS-REFERENCE TO A RELATED APPLICATION

This application is a National Phase Patent Application of International Patent Application Number PCT/EP2015/055618, filed on Mar. 18, 2015, which claims priority of German Patent Application Number 10 2014 206 671.9, filed on Apr. 7, 2014, and of German Patent Application Number 10 2014 210 302.9, filed on May 30, 2014, the entire contents of all of which are incorporated herein by reference.

BACKGROUND

The present invention relates to a method for setting a safety belt in a vehicle as well as an adjusting apparatus for a safety belt in a vehicle.

For a function which is as optimal as possible of a safety belt as part of a restraint system in a vehicle, it is important amongst other things that the safety belt is correctly set and runs according to its intended use, for example with a three-point belt over the chest and pelvic region of a vehicle occupant. In this case, a preset position of a deflection point for the safety belt in the region of the shoulder of a vehicle occupant on the vehicle seat or a vehicle part fixed to the bodywork is frequently only a compromise solution for a vehicle occupant of average size and in an optimally adopted seating position. Therefore, for many years it has been known to design a deflection point to be manually adjustable and which, for example, is provided for a front vehicle seat on the B-pillar of the vehicle in order to deflect the safety belt in the direction of the shoulder of a vehicle occupant. A vehicle occupant is thus able to set the height of the deflection point in order to adapt the path of the safety belt to the size and/or the (current) seating position thereof. In this case, the safety belt at the deflection point is generally guided out of the cladding, for example for a front vehicle seat the cladding of the B-pillar or a backrest of a vehicle seat. A portion of the safety belt fastened on the bodywork side, therefore, is installed behind the cladding or inside the vehicle seat.

Whilst in the event of a crash the action of the safety belt is considerably improved if the deflection point thereof has been adapted in the shoulder region to the size of the vehicle occupant, it is frequently seen in practice that a vehicle occupant does not undertake an accurate setting of the deflection point and/or a belt guiding element defining the deflection point. Even if, as in high-quality vehicles, it is possible to set the deflection point of the safety belt in the shoulder region by an externally applied force, generally by an electromotive drive, such a setting is only undertaken relatively rarely before the start of the journey.

Therefore, a mechanism in an adjusting apparatus for a safety belt is already proposed in WO 97/33 777 A1, in which a belt guiding element, via which a safety belt on an upper face of a backrest is deflected and is guided in the direction of the shoulder of a vehicle occupant fastened in by the safety belt, is able to be adjusted such that the position of the belt guiding element is altered depending on the size of the vehicle occupant using the safety belt. The belt guiding element in this case is designed in the form of a guide pin which is provided on a disk which is rotatably mounted inside the backrest. The adjusting apparatus disclosed in WO 97/33 777 A1, however, is only able to be used for safety belts integrated directly in the backrests of a vehicle seat. Additionally, however, an optimized setting of the path of the safety belt in the event of a crash is possible to a limited extent, since the belt guiding element is only rotatably mounted about one axis and also no means are provided for monitoring the correct position of the belt guiding element.

In this connection WO 2005/090118 A1 proposes to set automatically the position of a deflection point for a safety belt in the region of a shoulder of a vehicle occupant by means of at least one sensor device. In this case, a video sensor unit is proposed in order to detect, for example, the size of the vehicle occupant and the current seating position thereof and, depending thereon, to set not only the safety belt but also the position of a headrest, the backrest and a longitudinal seating position. Such an adjusting apparatus, by means of which an automatic setting in particular of an upper deflection point of a safety belt takes place individually for a vehicle occupant, certainly represents a marked improvement relative to the adjusting apparatus of WO 97/33777 A1. Such an adjusting apparatus is, however, very costly. In particular, the processing and evaluation of the data detected via a video sensor unit is generally extremely complex and thus hitherto an appropriate sensor device has rarely been able to be used in practice.

SUMMARY

In view of this background, the object of the present invention is to provide an improved method for the automatic setting of a safety belt in a vehicle as well an improved adjusting apparatus for a safety belt, in order to overcome or at least to minimize the aforementioned drawbacks. In particular, a more cost-effective and yet reliable option for the automatic setting of a safety belt to a vehicle occupant is intended to be provided.

This object is achieved both by a method as described herein and an apparatus as described herein.

According to the invention, in particular, a method for the automatic setting of a safety belt in a vehicle is provided, in which for the adjustment of the safety belt an adjusting apparatus is used, the position—preferably the height—of a deflection point for the safety belt being able to be set thereby, and the safety belt extending therefrom in the direction of the shoulder of a vehicle occupant fastened in via the safety belt, and the position of the deflection point is automatically set by means of at least one sensor device in order to adapt the path of the safety belt to the fastened-in vehicle occupant and preferably to the size and/or seating position thereof.

In this case, within the scope of a method according to the invention, the sensor device evaluates an angle which is present between a) on the one hand, a belt portion which extends from the deflection point in the direction of the shoulder of the fastened-in vehicle occupant, and b) on the other hand, a further belt portion and/or a part fastened to the bodywork or seat part in order to set automatically an adjusted position of the deflection point adapted to the fastened-in vehicle occupant via the adjusting apparatus.

As a result, according to the invention it is possible to evaluate, for example, which angle the (second) belt portion extending from the deflection point to the shoulder of the fastened-in vehicle occupant adopts in the region of the deflection point relative to the other (first) belt portion extending toward the deflection point and/or a vehicle part such as the B-pillar and/or a seat part, such as the backrest, the belt being guided thereon from a fastening point on the bodywork side. Thus it has been shown that via such an angle conclusions may be easily drawn indirectly about the size and/or seating position of a vehicle occupant. Thus using this angle it is possible to predict whether the belt path in the shoulder region of the vehicle occupant is optimal or not.

By the method according to the invention, therefore, in a particularly simple and cost-effective manner an automatic setting of a safety belt is possible in the best possible manner, in particular with regard to an individual securing of the vehicle occupant on a vehicle seat in the event of a crash. Therefore, it is not necessary that a vehicle occupant manually sets an upper deflection point for the safety belt. This is undertaken automatically, for example immediately after fastening the seatbelt or starting the vehicle engine. In this case, the solution according to the invention is naturally able to be easily combined with further comfort functions in connection with a safety belt, for example with an adjusting system for extending a belt buckle on the side of a vehicle seat or a belt extender in the shoulder region of the vehicle occupant, in order to simplify the fastening by the safety belt.

Within the scope of a method according to the invention, by means of the at least one sensor device the height of the deflection point in the region of the shoulder of a fastened-in vehicle occupant may be automatically set in order to adapt the path of the safety belt to the size and/or seating position of the vehicle occupant. For setting the adjusted position of the deflection point which is adapted to the fastened-in vehicle occupant, additionally further sensor data of further sensor devices may also naturally be incorporated. For example, it is conceivable via a sensor device to detect the weight of the fastened-in vehicle occupant and to take this into account for setting an adjusted position of the upper belt deflection point.

For the adjustment of the deflection point by an externally applied force, the adjusting apparatus preferably comprises an electromotive drive. For example, in this case a spindle drive may also be provided in order to adjust, in particular, a belt guiding element defining the deflection point in a longitudinal direction.

Preferably, an adjustment of the deflection point takes place until the evaluated angle, between the two belt portions and/or the one belt portion and the vehicle part fixed to the bodywork or the seat part, is in a predetermined angular range and/or a corresponding measured value is present. In principle, it may be provided that the evaluated angle has to be identical to an optimal stored angle, so that an adjusted position reached by the deflection point is maintained. In practice, however, a hundred percent congruence between the evaluated angle and the optimal stored angle for every vehicle occupant is generally not possible. Therefore, the predetermining of a permitted angular range in an evaluation logic is preferred. The predetermined angular range in this case may be defined by an optimal angle or reference angle and a predetermined tolerance range may be defined around this reference angle.

An evaluation as to whether the evaluated angle is in the predetermined angular range takes place using at least one of the measured values provided by the sensor device, optionally also a plurality of measured values. A measured value in this case is detected via the sensor device, for example in a capacitive, inductive and/or optical manner.

For evaluating the angle, at least one spacing between the belt portion extending from the deflection point in the direction of the shoulder of the fastened-in vehicle occupant and the other belt portion, a part fastened to the bodywork or seat part and/or the at least one sensor element is preferably detected by means of at least one sensor element of the sensor device. Accordingly, based on at least one measured value which is representative of a spacing, an evaluation of the relevant belt angle is carried out in order to undertake optionally an adjustment of the deflection point. In this case, for example, it is possible to detect the spacing of the belt portion itself, extending in the direction of the shoulder of the fastened-in vehicle occupant, in different regions from a part fixed to the bodywork or seat part and/or the sensor element.

Thus, for example, by measuring two spacings by means of two sensor elements arranged spatially offset to one another, the relevant belt angle and the belt length may be deduced very reliably in order to initiate an adjustment of the deflection point as required in an automated manner. By the use of a plurality of sensor elements, additionally a plausibility check is possible as to whether the measured values detected by a sensor element may be relevant.

In one development, it may also be provided that, in addition to the belt angle, the belt height is also monitored by sensor. For example, to this end a spacing of an upper face of a belt portion extending in the direction of the shoulder of a fastened-in vehicle occupant, relative to a vehicle roof and/or a sensor element arranged above the safety belt, may be detected and evaluated.

In order to be able to make a more reliable prediction about the path of the safety belt and the belt angle to be evaluated, preferably a plurality of (at least two) sensor elements of the sensor device, which are spatially separate from one another, are used. At different points, a spacing of the belt portion extending in the direction of the shoulder of a fastened-in vehicle occupant may be detected thereby in a contactless manner, in each case at a defined point. To this end, for example a plurality of sensor elements are arranged adjacent to one another and/or above one another relative to a vehicle vertical axis, in particular preferably above and/or below the deflection point. For example, to this end sensor elements of the sensor device are arranged above and/or below a belt outlet opening/a belt strap outlet on a B-pillar of the motor vehicle. The sensor elements may, for example, comprise an optical, in particular a camera-based sensor, an ultrasound sensor or a capacitive sensor. In particular, via such sensor elements, therefore, a spacing relative to the belt lower face of the belt portion extending in the direction of the vehicle occupant and/or a spacing relative to the upper face of this belt portion may be detected in order to deduce the belt angle and optionally to undertake an adjustment of the upper deflection point of the safety belt by an externally applied force.

The evaluation as to whether the evaluated angle is in the predetermined angular range and which is undertaken in an evaluation logic of a control electronics unit coupled to the sensor device, may be carried out during and/or after completing an adjustment of the deflection point. In the first-mentioned case, it is already monitored during the adjustment process how far the currently evaluated angle corresponds to a reference value or is in a reference range and subsequently the adjustment of the deflection point is halted. Alternatively or additionally, after completing an adjustment of the deflection point it is (once again) monitored whether the deflection point adopts the desired adjusted position and thus the resulting angle corresponds to the reference angle or at least is in the reference range.

In one exemplary embodiment, a signal may be produced for providing acoustic and/or visual information to the vehicle occupant when it is established that the evaluated angle is in the predetermined angular range. Thus it is automatically signaled to the vehicle occupant that the safety belt, said vehicle occupant being fastened in thereby, has the best possible path for his/her body size, stature and/or seating position, and also that this path has also been set and electronically monitored.

In one exemplary embodiment, an evaluation of the respective angle and thus an automatic setting of the deflection point may only take place upon at least one detected operating event. For example, an automatic setting is only undertaken after the insertion of an insertion tongue of the safety belt into a belt buckle and/or the starting of an engine of the vehicle has been detected. By an automatic setting and thus, for example, an adaptation of the belt height taking place only when an insertion tongue has been inserted into a belt buckle and the engine of the vehicle has been started, an automatic actuation of the adjusting apparatus for the safety belt may be limited more easily to those cases where it may be actually deduced that a vehicle occupant has taken a seat on a vehicle seat as intended and the setting of the belt height is required.

In one exemplary embodiment, an evaluation of the angle and thus a setting of the deflection point by applying an external force may be automatically repeated after a predefined and preferably adjustable time period has passed. Such a time period, after which optionally it is verified again whether the safety belt is correctly set, is calculated, for example, from the last setting process and/or the start of a journey, i.e. the start of a journey with the vehicle. In this manner, a correct position of the deflection point and/or a belt guiding element defining this deflection point is tested again and optionally corrected due to an altered seating position of the vehicle occupant. Alternatively, it may naturally be provided that a path of the safety belt is continuously monitored via the at least one sensor device in order to adapt this safety belt shortly afterwards, in particular, when the vehicle occupant alters the seating position.

According to a further feature of the present invention an adjusting apparatus for a safety belt in a vehicle is provided, said adjusting apparatus comprising at least one adjustable belt guiding element for defining a deflection point and a sensor device. The safety belt extends away from the belt guiding element in the direction of the shoulder of a vehicle occupant fastened in by the safety belt. The belt guiding element, therefore, generally predetermines an upper deflection point for the safety belt and thus the belt height. By means of the at least one sensor device an adjusted position of this belt guiding element is able to be set automatically in order to adapt the path of the safety belt to the fastened-in vehicle occupant.

According to the invention, the sensor device in this case is configured and provided to evaluate an angle which is present between a) a belt portion which extends, on the one hand, from the deflection point in the direction of the shoulder of the fastened-in vehicle occupant and
b) a further belt portion of the safety belt and/or a component fixed to the bodywork or seat part, in order to predetermine an adjusted position for the adjustable belt guiding element which is adapted to the fastened-in vehicle occupant. The adjustment of the belt guiding element in this case is preferably controlled by a control electronics unit of the adjusting device.

As already explained above, via the at least one sensor device an angle is able to be evaluated between two belt portions in the region of the deflection point, a first belt portion extending therefrom, from a fastening point of the safety belt on the bodywork side to the deflection point, and the other second belt portion extending therefrom, from the deflection point in the direction of the shoulder of the fastened-in vehicle occupant. Alternatively or additionally, it is possible for an angle to be able to be evaluated, said angle being present between the second belt portion and a vehicle part fixed to the bodywork, such as for example a B-pillar or a vehicle seat part, such as for example a backrest.

As a result, it is provided to activate a motorized drive of the adjusting apparatus by considering the evaluated angle between the two belt portions and/or between the belt portion extending in the direction of the shoulder and a vehicle part or seat part, such that the belt guiding element adopts an adjusted position adapted to the fastened-in vehicle occupant, in which via the safety belt an individual securing of the vehicle occupant which is as optimal as possible is achieved on a vehicle seat in the event of a crash.

The adjusting apparatus in this case may preferably comprise a control electronics unit coupled to the at least one sensor device, the method steps explained above of a method according to the invention for setting a safety belt being able to be carried out thereby and, in particular, a corresponding evaluation being undertaken thereby and an associated adjusting movement of the belt guiding element being able to be controlled thereby. Advantages and features explained for a method according to the invention, therefore, also apply to an adjusting apparatus according to the invention and vice versa.

Moreover, for the adjustment by applying an external force a spindle drive known per se may be provided as part of the adjusting apparatus, for example. Thus the belt guiding element, for example, is able to be adjusted longitudinally inside a hollow space provided with cladding on a B-pillar of the vehicle in order to set the height of an (upper) deflection point defined thereby for the safety belt, in a particularly simple manner and depending on the evaluated angle.

As already explained in connection with possible variants for a method according to the invention, in one variant of an adjusting apparatus according to the invention it may also be provided that the sensor device for evaluating the angle comprises at least one sensor element, a spacing being able to be detected thereby—preferably in a contactless manner—between a defined point and the belt portion extending in the direction of the shoulder of the fastened-in vehicle occupant. Accordingly, for example, a spacing may be detected by the sensor device between this belt portion and
  a further belt portion extending, for example, in the region of the B-pillar substantially in a linear manner,
  a part fixed to the bodywork or seat part and/or
  the at least one sensor element—preferably fixed to the belt guiding element or a cladding therefor.

For example, at least two sensor elements may be provided arranged adjacent to one another and/or above one another relative to a vehicle vertical axis in order to detect in each case a spacing. Thus at least two measured spacing values are available, a control electronics unit coupled to the sensor device being able to evaluate the belt angle thereby, in order to alter a position of the belt guiding element if required. By the points of the belt portion spaced apart spatially from one another being considered with regard to their spacing from a defined point or region, the belt angle to be evaluated may be deduced in a simple and reliable manner.

In one exemplary embodiment, at least two sensor elements in each case are arranged above the deflection point in order to detect in each case a spacing relative to the upper face of the belt portion. Alternatively or additionally two (further) sensor elements may be provided, in each case said sensor elements being arranged below the deflection point in order to detect in each case a spacing relative to the lower face of the belt portion extending in the direction of the shoulder of the vehicle occupant. Optionally, relative to the vehicle vertical axis at least one sensor element may also be arranged above and at least one further sensor element may be arranged below the belt guiding element or a belt strap outlet.

Moreover, in one development it may be provided that at least one sensor element of the sensor device is arranged so as to be inclined relative to the vertical when the adjusting apparatus is mounted as intended in a vehicle. In this case, via the alignment of the sensor element, optionally the region monitored in a contactless manner by the sensor element may be aligned in the direction of the belt portion to be monitored.

Via a sensor element or a plurality of sensor elements, moreover, a belt height may be detected by sensor, in particular relative to a vehicle roof and/or a vehicle roof lining in the interior of the vehicle.

A control electronics unit for evaluating the belt angle and activating a drive unit of the adjusting apparatus for adjusting the belt guiding element may, for example, be accommodated inside the B-pillar of a vehicle. Alternatively or additionally, the control electronics unit and at least one sensor element may be located on a printed circuit board of the adjusting apparatus. Independently thereof, moreover, a configuration of at least one part of the sensor device as a printed circuit board or as a printed circuit board with a plug outlet is possible.

In one variant, the at least one sensor element is arranged behind and/or inside a component made from a optically and/or electromagnetically transparent material. For example, at least one sensor element of the sensor device may be arranged on or in a cladding part for the vehicle interior, the belt guiding element being adjustable relative thereto or together therewith. Such a cladding part may, for example, be provided on a B-pillar of the vehicle and cover a region on the B-pillar at least partially in which the belt guiding element and an associated drive unit are accommodated.

The at least one sensor element of the sensor device may, in principle, be provided on the adjustable belt guiding element. For example, the sensor element in this case is fixed to an outer face of the belt guiding element or a component of the adjusting apparatus adjacent to the belt guiding element, which preferably is adjusted therewith. Alternatively, a sensor element may be embedded in the material of the belt guiding element, for example by the sensor element during the production of the belt guiding element being encased by injection-molding or sprayed thereon.

A measured value which is representative of the angle to be evaluated may be detected via the sensor device in a capacitive, inductive and/or optical manner. It is important in the present case only that the representative angle is able to be detected via the sensor device and, for example via a sensor element or a plurality of sensor elements of the sensor device, a corresponding monitoring region is provided in the region of the deflection point.

BRIEF DESCRIPTION OF THE DRAWINGS

Further advantages and features of the present invention are disclosed in the following description of exemplary embodiments with reference to the accompanying figures.

FIGS. 4A-4D show different variants of an adjusting apparatus according to the invention with differently positioned sensor elements of an associated sensor device for evaluating a belt angle.

FIGS. 6A-8B show in different views a variant of an adjusting apparatus according to the invention with two or four sensor elements fixedly attached below the belt guiding element.

FIGS. 9A-14B show in different views a variant of an adjusting apparatus according to the invention with one or more sensor elements fixedly attached above the belt guiding element.

DETAILED DESCRIPTION

Figure 1:
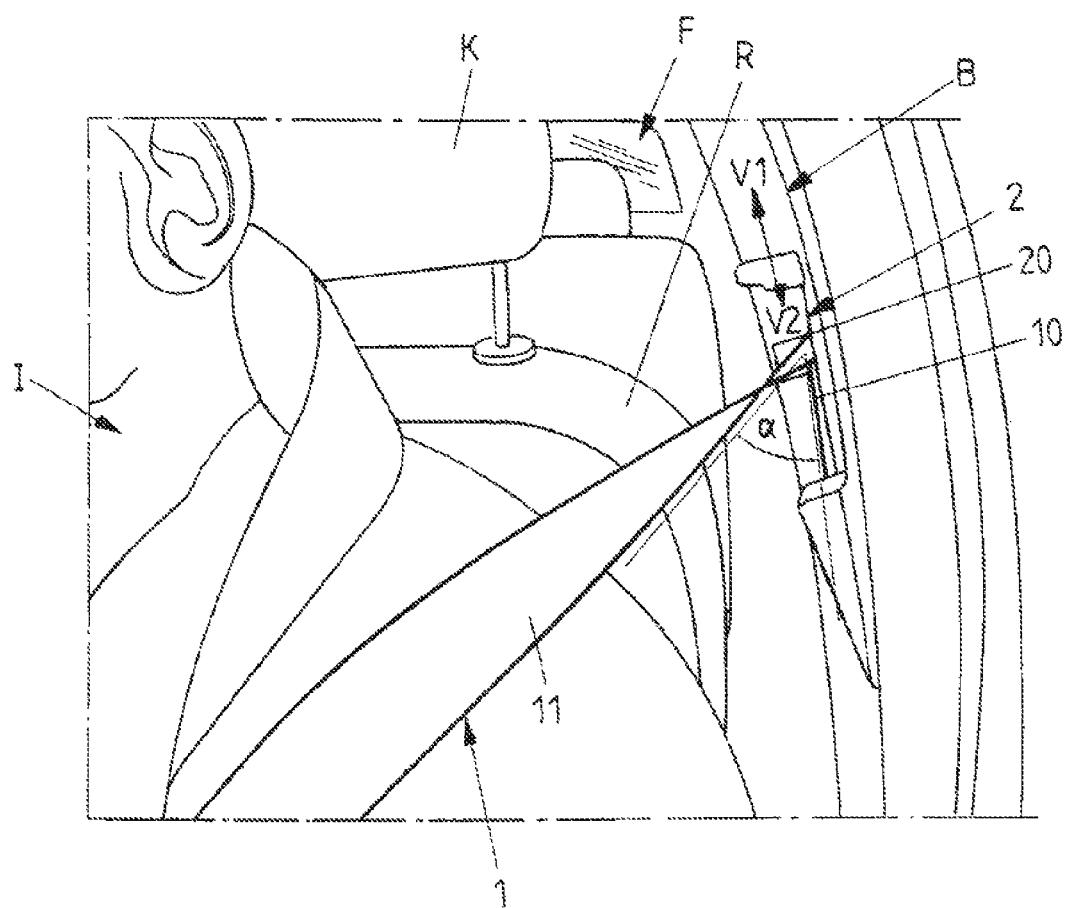
FIG. 1 shows a detail of a vehicle interior with a fastened-in vehicle occupant located on a vehicle seat and with a highlighted evaluated (belt) angle which is detected and evaluated by sensor in order to set a belt height.

In FIG. 1 a vehicle interior is shown in a detail in which a vehicle occupant I has taken a seat on a front vehicle seat F. A headrest K and a backrest R of this vehicle seat are also visible in detail in FIG. 1.

The vehicle occupant I is secured to the vehicle seat F by a safety belt 1, in this case in the form of a three-point belt. In a manner known per se, in this case a belt portion 11 of the safety belt 1 extends transversely over the chest region of the vehicle occupant and over the shoulder of the vehicle occupant I to the rear to a deflection point, the safety belt 1 being deflected thereby to a fastening point on the bodywork side. This deflection point in the exemplary embodiment shown is defined by a belt guiding element 20 of an adjusting apparatus 2 on a B-pillar B of the vehicle. An upper part of the safety belt 1 is deflected at this belt guiding element 20 so that the safety belt is able to extend from a fastening point on the bodywork side in the region of the vehicle floor to the shoulder of a vehicle occupant I. The belt guiding element 20, for example, is able to be adjusted via a spindle drive, along the B-pillar B in opposing directions of adjustment V1 and V2, in order to set the belt height.

If the vehicle occupant I as shown in FIG. 1 has fastened the safety belt, a first belt portion 10 extends along a vehicle part fixed to the bodywork in the form of the B-pillar B to the deflection point defined by the belt guiding element 20. The second belt portion 11 adjoins this first belt portion in the direction of the vehicle occupant I, said second belt portion extending from the deflection point of the belt guiding element 20 to the shoulder of the vehicle occupant I. Between these two belt portions 10 and 11 a (belt) angle α is present. This angle α depends on the seating position and the size of the vehicle occupant I as well as the belt height. From the available data which, for example, has been empirically determined during the course of crash testing, and/or has been calculated in simulated crashes, it is known at which angle α the two belt portions 10 and 11 have to extend relative to one another so that the vehicle occupant I is secured by the safety belt 1 in an optimum manner in the event of a crash.

According to the invention, therefore, it is provided to detect and to evaluate via a sensor device with at least one sensor element which is provided, for example, in the region of the belt guiding element 2, a current actual value for the angle α and to deduce therefrom whether the belt height set by the belt guiding element 2 is optimal for the currently fastened-in vehicle occupant I. Based on data stored in an evaluation logic, optionally an adjustment of the belt guiding element 20 via an electromotive drive is now controlled in the direction of adjustment V1 or V2, so that the angle α evaluated by the sensor device is altered. Via the adjustment of the belt guiding element 20, the belt height is set in this case such that the angle α is in a predetermined reference angular range and, as a result, for the fastened-in vehicle occupant I the greatest possible safety is provided by the safety belt 1 in the event of a crash.

In this case, the setting of the belt height to the individual vehicle occupant I may be initiated automatically as soon as an operating event such as the insertion of an insertion tongue of the safety belt 1 into a belt buckle has been detected. Optionally an automatic setting is only undertaken after the starting of a vehicle engine has been additionally detected.

In one variant, it is further provided to monitor the adjusted position of the belt guiding element 20 and thus the set belt height repeatedly, optionally after predefined time periods. As a result, for example, after a certain length of journey, a readjustment of the belt height is undertaken once again if the vehicle occupant I, for example, has altered the seating position.

In a solution according to the invention, as only one (belt) angle α is detected by sensor between two belt portions 10 and 11 and is evaluated for setting a belt height, both a sensor device and an associated evaluation electronics unit may be designed relatively simply, in order to control an adjustment movement of the belt guiding element 20. In one variant, in this case alternatively or to reduce the measurement uncertainty an angle may be evaluated which is produced between the belt portion 11 extending to the shoulder of the fastened-in vehicle occupant I and the B-pillar B.

In a modification of the exemplary embodiment shown by way of example in FIG. 1, naturally it may also be provided that a belt guiding element is directly provided on a backrest of the vehicle seat and an adjusted position of this belt guiding element on the backrest is varied depending on a (belt) angle, in order to adapt the belt height individually to a fastened-in vehicle occupant I.

Figure 2:
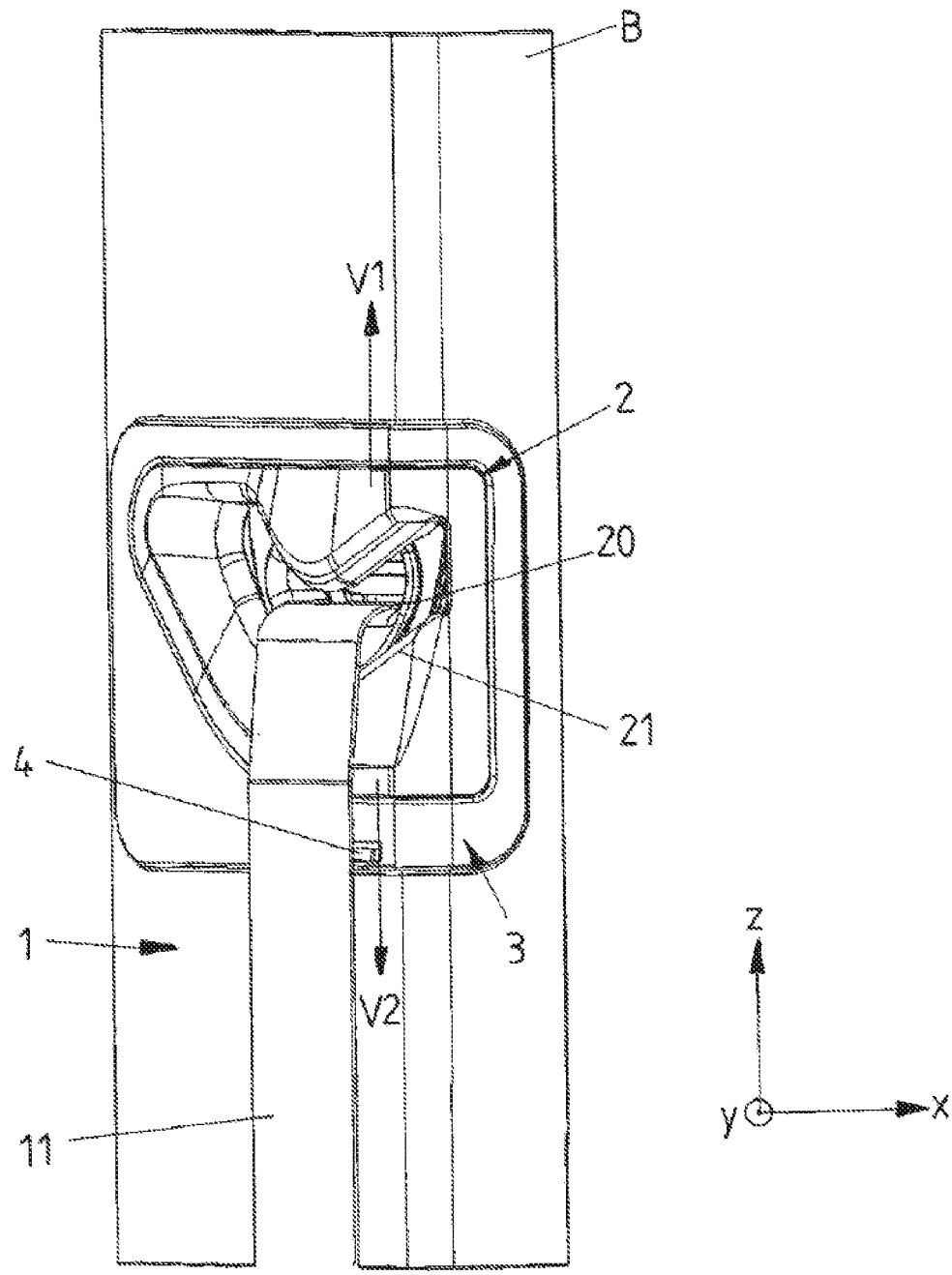
FIG. 2 shows an enlarged view of an exemplary embodiment of an adjusting apparatus with an adjustable belt guiding element.
Figure 3B:
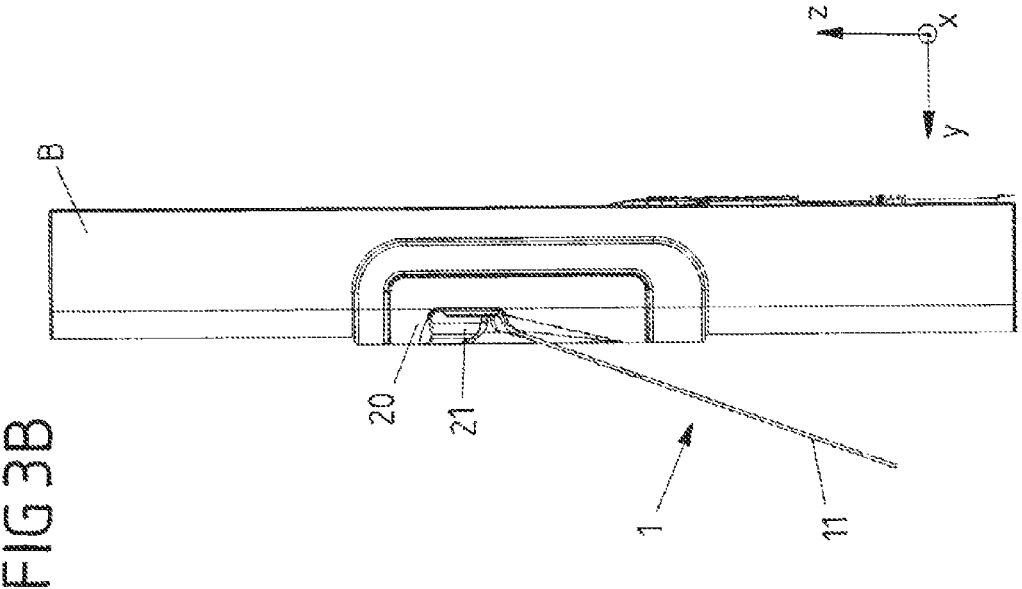
FIGS. 3A-3B show side views of the adjusting apparatus of FIG. 2 with a safety belt in the resting position and with a fastened-in vehicle occupant.
Figure 3A:
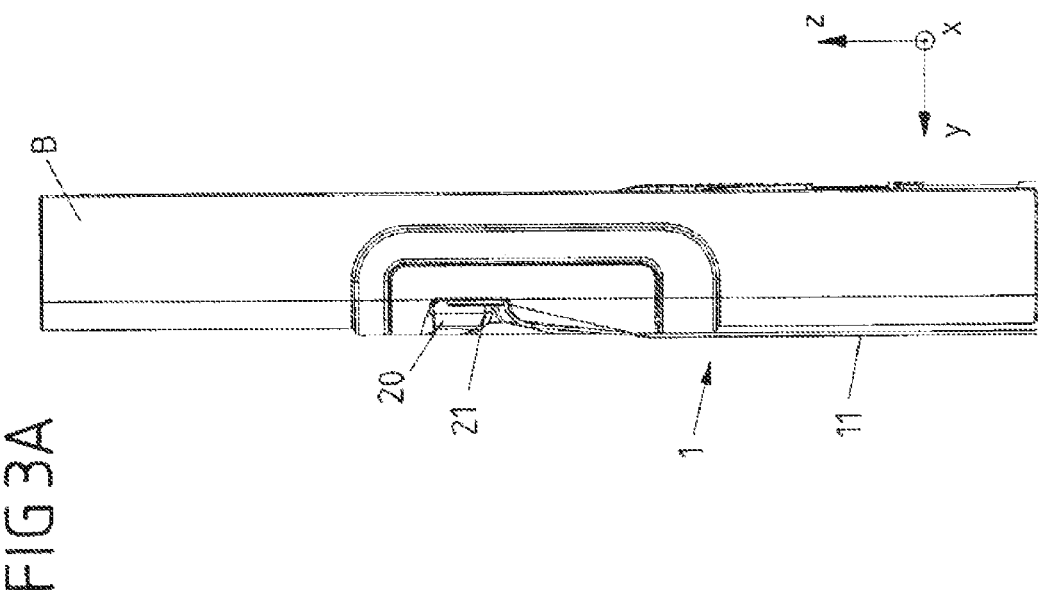

One possible variant of an adjusting apparatus 2 is illustrated by means of FIG. 2 in greater detail, the belt guiding element 20 thereof being adjustably arranged on the B-pillar B in the directions of adjustment V1 and V2. The adjusting apparatus 2 defines a belt strap outlet 21 via which the safety belt 1 may be pulled out from the interior of the B-pillar B for fastening the safety belt. The adjustable belt guiding element 20 in this case is covered externally on the B-pillar B at least partially by a cladding part 3. This cladding part 3 is fixed to the bodywork and may be immovably fixed either to the B-pillar B or may be arranged adjustably on the B-pillar B via a drive unit of the adjusting apparatus 2, not shown in more detail, together with the belt guiding element 20. In the side views of FIGS. 3A and 3B, the adjusting apparatus of FIG. 2 with the safety belt 1 is firstly shown in a resting position when a vehicle occupant is not fastened-in thereby, and in a position in which a vehicle occupant is fastened-in as intended via the safety belt 1.

In the present case, the cladding part 3 bears a sensor element 4 of the sensor device, a position of the belt portion 11 being able to be detected thereby and the belt angle α being able to be evaluated thereby, by sensor. The sensor element 4 is arranged below the belt strap outlet 21 and thus below the belt guiding element 20 on the cladding part 3. The sensor element 4, for example in the form of an optical or capacitive sensor or in the form of an ultrasound sensor, in this case detects a spacing of the belt portion 11 substantially along a horizontal line, relative to the sensor element 4
and/or the B-pillar B
and/or the cladding part 3.

Via the sensor element 4, therefore, a lateral spacing of the belt portion 11 is measured relative to the belt lower face, in order to deduce the size of the belt angle α and to evaluate thereby whether a vehicle occupant is optimally belted-in. If the belt angle α deviates by more than a stored tolerance value from a reference angle which is regarded as reliable, an adjustment of the belt guiding element 2 takes place automatically.

In the side views of FIGS. 4A, 4B, 4C and 4D different variants of a solution according to the invention are illustrated, said variants differing in the arrangement of individual sensor elements 4, 5, 6 and 7 and regarding the measured values detected thereby.

In the variant of FIG. 4A, two sensor elements 4 and 5 arranged spatially above one another relative to a vehicle vertical axis are integrated in the cladding part 3 below the deflection point for the safety belt 1 defined by the belt guiding element 20. Via the two sensor elements 4 and 5 in each case a lateral spacing d1 or d2 of the belt portion 11 relative to the respective sensor element 4 or 5, or the B-pillar B, is detected in a contactless manner. In this case via the two sensor elements 4 and 5 the spacing of the belt portion 11 relative to the B-pillar B is able to be detected at different points so that via the corresponding measured values, by means of an evaluation logic stored in a control electronics unit SE, conclusions may be drawn about the size of the belt angle α. Via the control electronics unit SE, therefore, a drive unit AE may be activated in order to alter optionally the position of the belt guiding element 20.

Figure 4B:
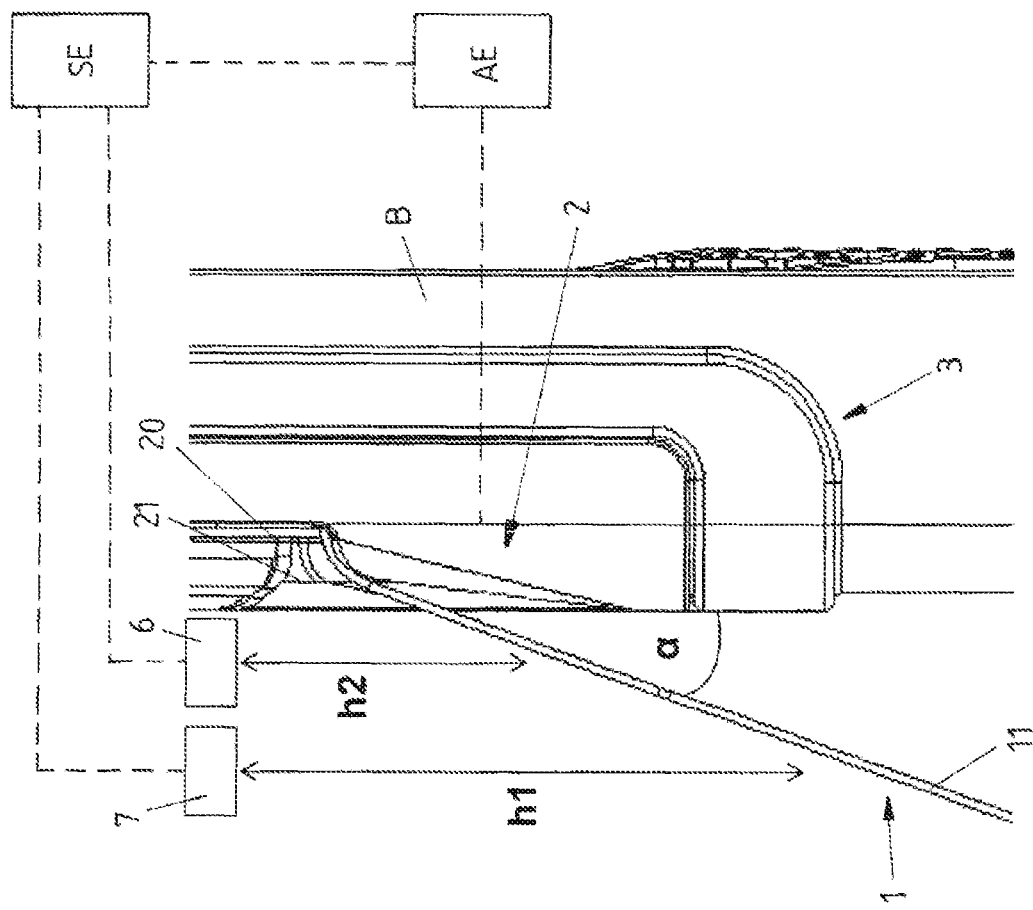

In the variant of FIG. 4B, two sensor elements 6 and 7 are arranged adjacent to one another above the belt strap outlet 21 and thus above the deflection point for the safety belt 1 defined by the belt guiding element 20. Via the two sensor elements 6 and 7, in each case a (vertical) spacing h1 or h2 of the belt portion 11 relative to the respective sensor element 6 or 7 may be detected. Here, as a result, a spacing h1 or h2 relative to an upper face of the belt portion 11 is detected. Using measured values which in each case are representative of a spacing of the belt upper face of the belt portion 11 relative to the respective sensor element 6 or 7—and thus to different defined points on the B-pillar B—conclusions may be easily drawn here about the size of the belt angle α via the control electronics unit SE.

In the variant of FIG. 4C a first sensor element 4 is provided below the belt strap outlet 21 and a second sensor element 6 is provided above the belt strap outlet 21, in order to draw conclusions about the size of the belt angle α using at least one horizontal and/or lateral spacing d2 and at least one vertical spacing h2 of the belt strap outlet 11 relative to the sensor elements 4 and 6.

Figure 4D:
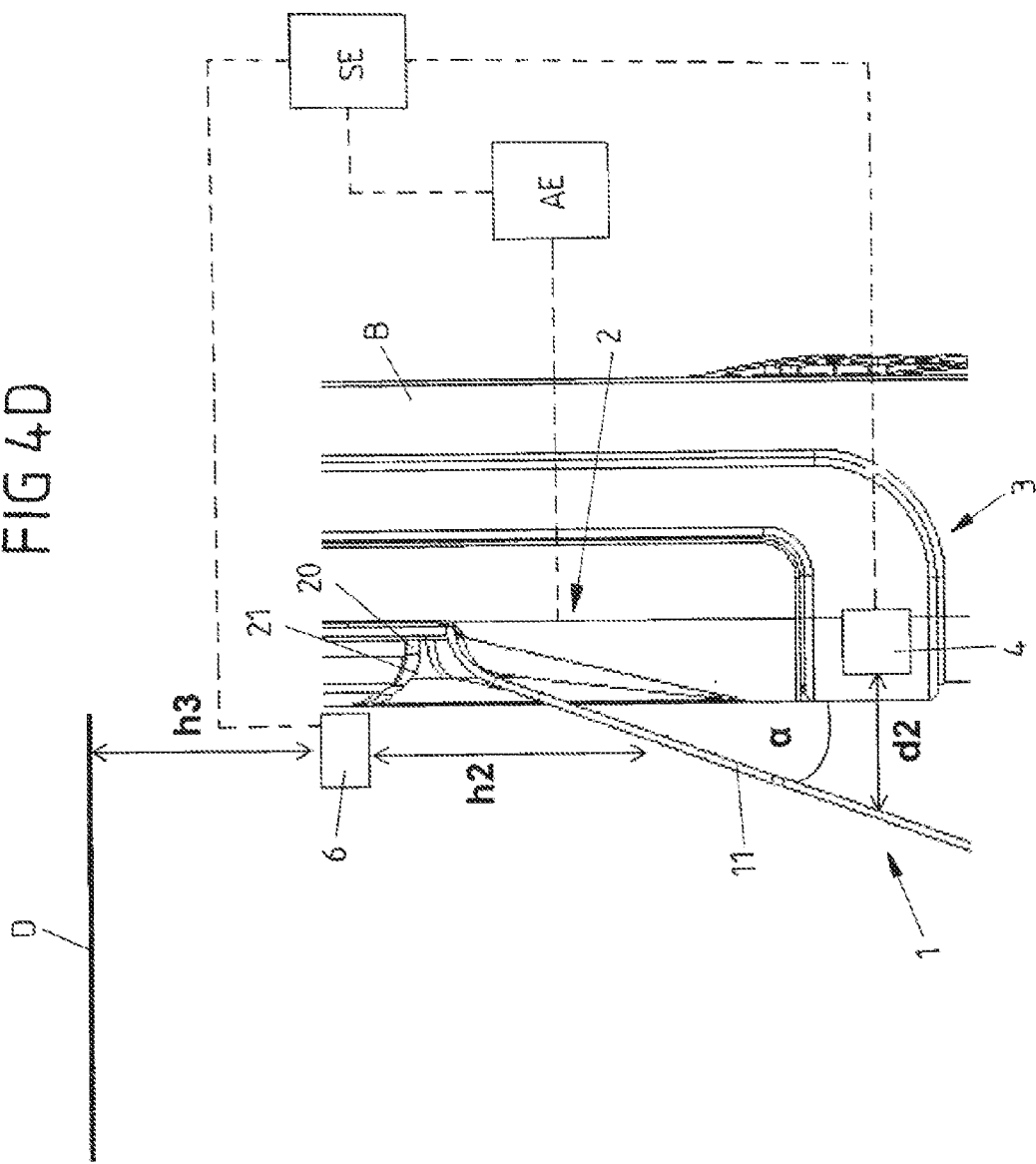

In the variant of FIG. 4D it is further provided that a vertical spacing h3 for determining the belt height is additionally evaluated. In this case, the sensor element 6 is arranged above the belt strap outlet 21 and arranged on or in the cladding part 3, which here together with the belt guiding element 20 is able to be adjusted on the B-pillar B. Via the sensor element 6 the spacing h3 of the sensor element 6 relative to a vehicle roof lining and/or a vehicle roof D may be (additionally) detected and conclusions drawn about the belt height of the safety belt 1.

Instead of mounting or integrating the sensor element 6 in the cladding part 3 the sensor element 6 of the variant of FIG. 4D naturally may also be provided on the adjustable belt guiding element 20. This naturally also applies to the sensor elements 4, 4.1, 4.2, 5. 5.1, 5.2, 6.1, 6.2, 7, 7.1 and 7.2 discussed above and below.

Figure 5B:
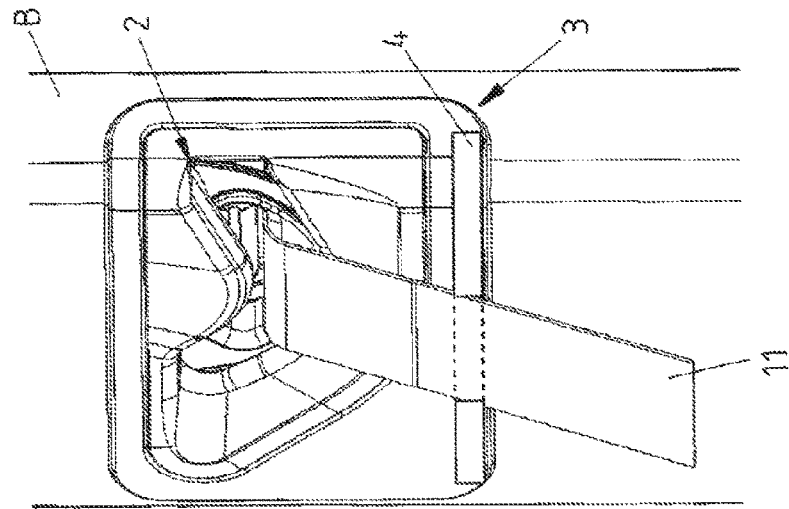
FIGS. 5A-5D show in different views a variant of an adjusting apparatus according to the invention with a sensor element attached fixedly below the belt guiding element.
Figure 5A:
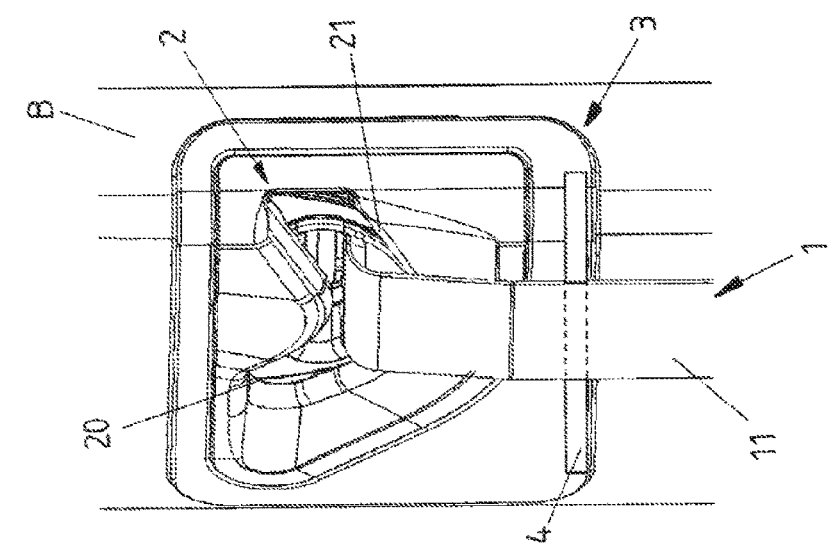

In FIGS. 5A and 5B one possible design of a sensor element 4 in the form of an elongated sensor strip below the belt strap outlet 21 on the B-pillar B is illustrated.

Figure 5C:
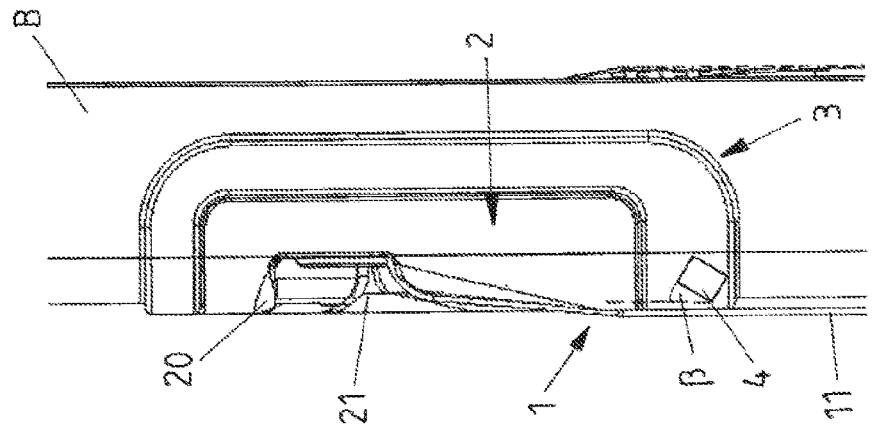
Figure 5D:
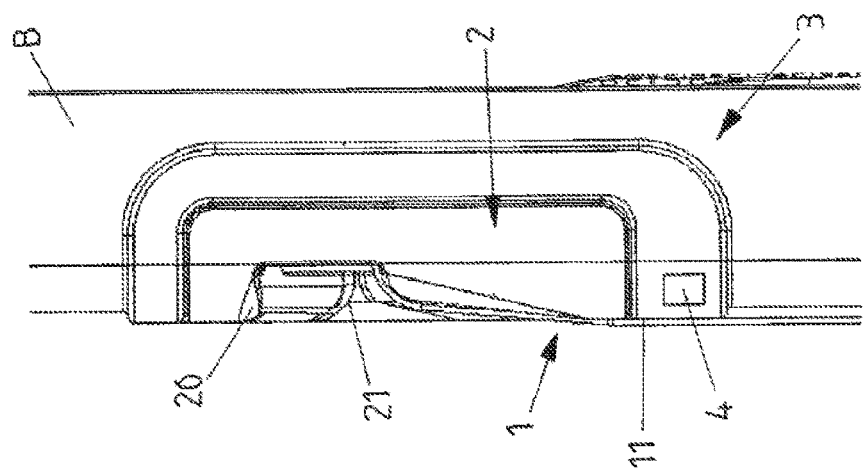
Figure 10A:
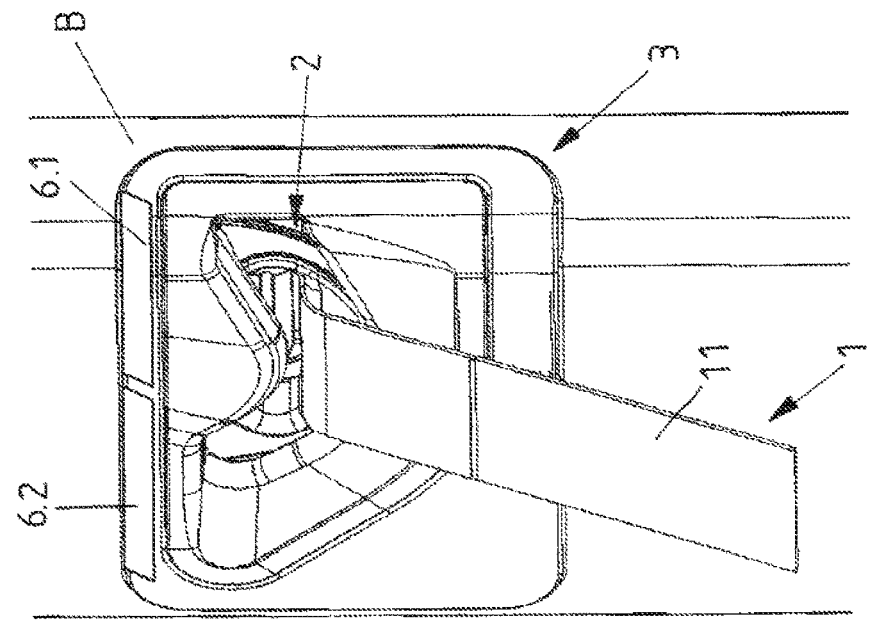
Figure 10B:
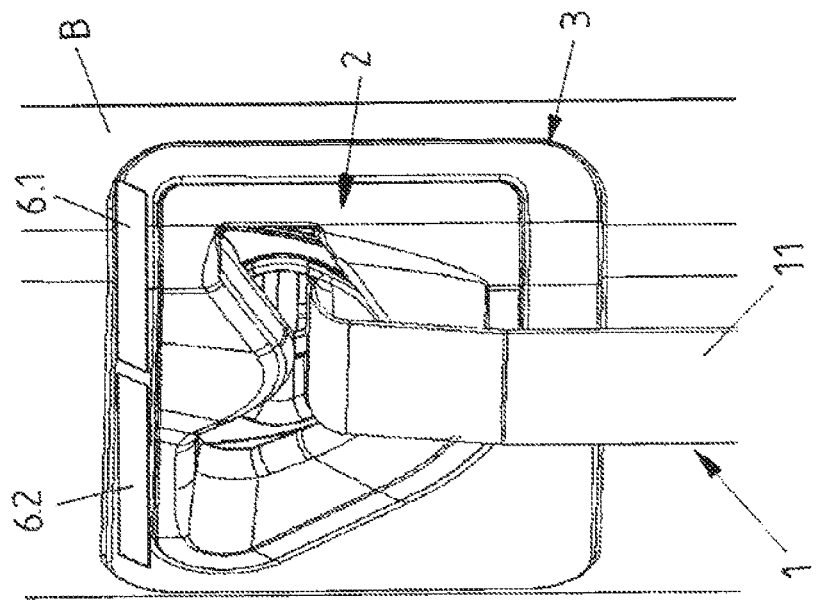
Figure 12B:
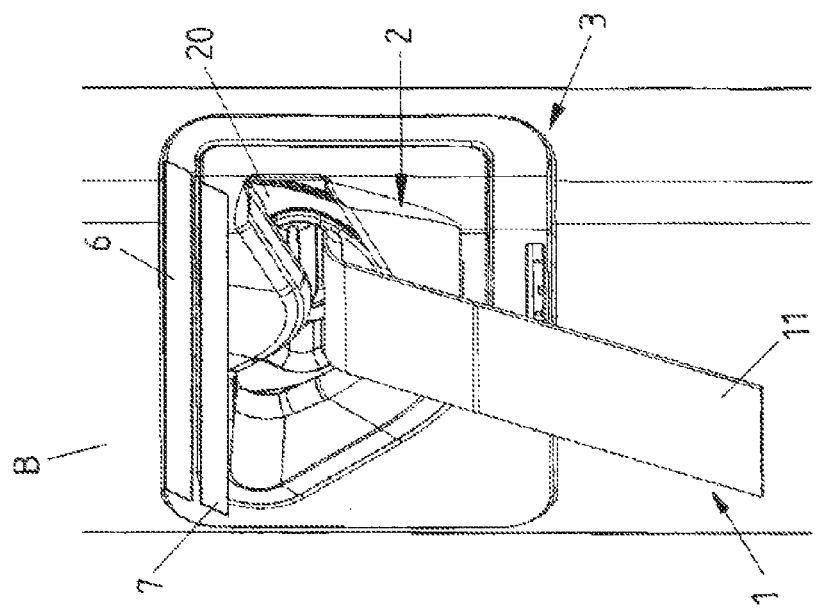
Figure 12A:
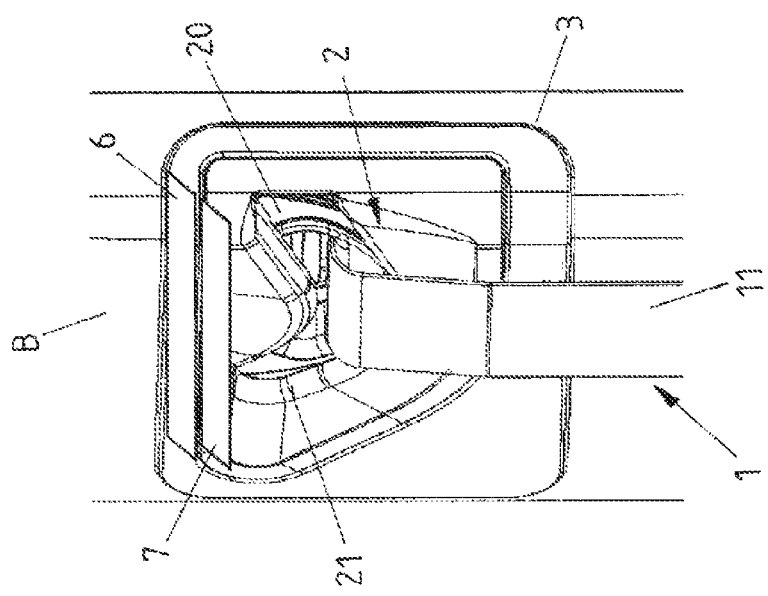

In the opposing position of FIGS. 5C and 5D, in this case it is also illustrated that a sensor element 4 naturally may also be inclined by an angle of inclination β relative to the vertical and thus obliquely arranged, in order to align a sensor field emitted by the sensor element 4 so that it is more sharply inclined relative to the vertical or horizontal.

One possible variant based on the exemplary embodiment of FIG. 4A is illustrated by FIGS. 6A and 6B. In this case, two sensor elements 4 of strip-shaped configuration and 5 are provided above one another and below the belt strap outlet 21 on the cladding part 3.

The views of FIGS. 7A and 7B also illustrate a further possible exemplary embodiment with a total of four separate sensor elements 4.1, 4.2 and 5.1, 5.2 which in each case are arranged below the belt strap outlet 21 on the cladding part 3. In this case, in each case one pair of sensor elements is formed by two sensor elements 4.1, 4.2 and 5.1, 5.2 adjacent to one another relative to the vehicle vertical axis. The two pairs of sensor elements 4.1, 4.2 and 5.1, 5.2 in turn are located above one another. Via the arrangement shown, at least four different measured spacing values for the evaluation of the belt angle α may be provided.

As is shown in the opposing position of FIGS. 8A and 8B, naturally also with the use of a plurality of sensor elements 4, 5 or 4.1, 4.2 and 5.1, 5.2 arranged above one another, said sensor elements may be arranged not only along the vehicle vertical axis aligned with one another, but also (see FIG. 8B) along the vehicle vertical axis offset to one another and in particular in each case inclined to the same extent relative to the vertical by an angle of inclination β.

FIGS. 9A-9B, 10A-10B, 11A-11B, 12A-12B, 13A-13B and 14A-14B illustrate, in a similar manner to the previously described figures, possible variants in which a sensor element 6 or a plurality of sensor elements 6, 7 or 6.1, 6.2, 7.1, 7.2 are arranged above one another and/or adjacent to one another above the belt strap outlet 21 on the cladding part 3. Here, relative to a belt upper face of the belt portion 11 a spacing is detected in each case in order to deduce a belt angle α. FIGS. 11A-11B and 14A-14B in this case also illustrate the possibility of providing individual sensor elements which are inclined relative to the vertical.

Figure 15A:
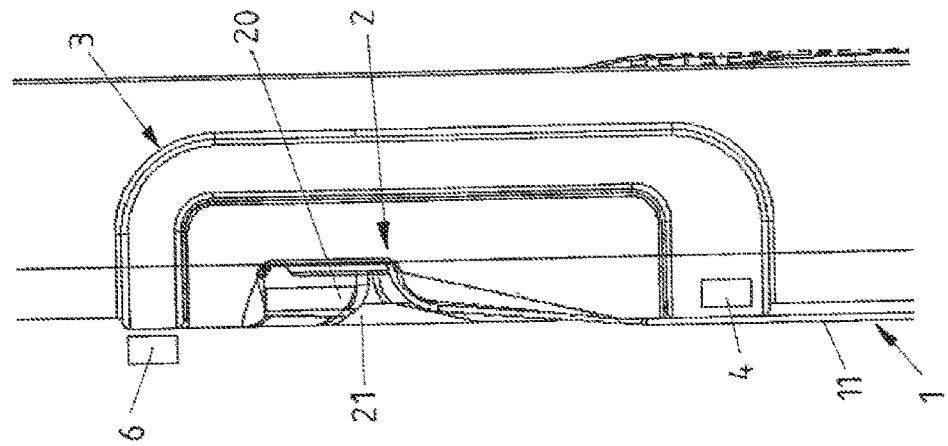
FIGS. 15A-15B show in different views a variant of an adjusting apparatus according to the invention with one sensor element fixedly attached below and one sensor element fixedly attached above the belt guiding element.
Figure 15B:
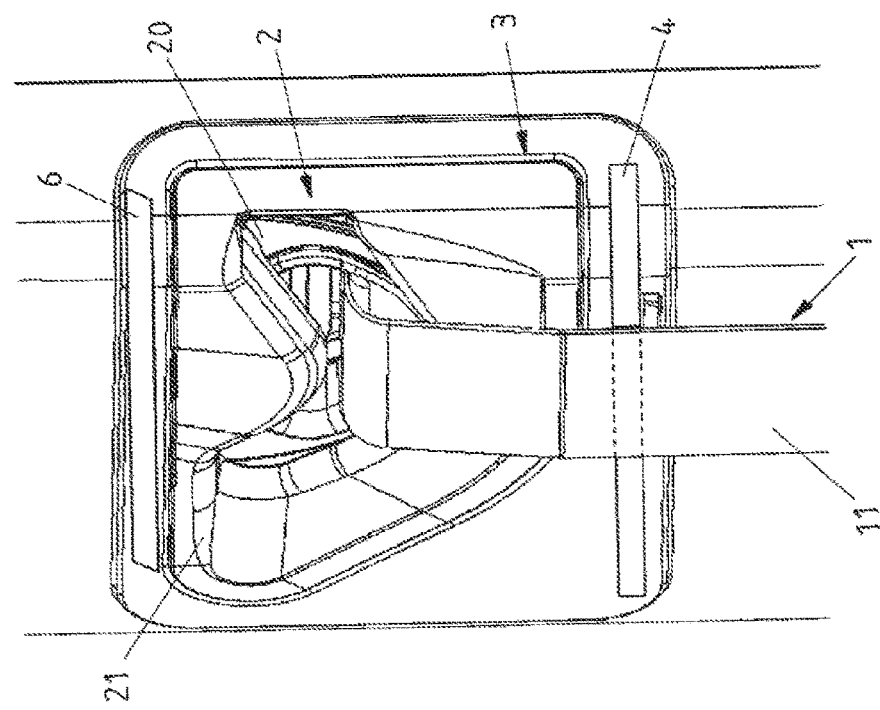

With the two different views of FIGS. 15A and 15B, the variant already discussed in FIG. 4C is illustrated in more detail, in which a sensor element 4 is arranged below the belt strap outlet 21 and a further sensor element 6 is arranged above the belt strap outlet 21 on the cladding part 3. Also, the two sensor elements 4 and 6 in each case are of strip-shaped configuration here.

The sensor elements 4, 4.1, 4.2, 5, 5.1, 5.2, 6, 6.1, 6.2, 7, 7.1, 7.2, for example, may be integrated in the material of the cladding part 3 and/or in each case retrospectively mounted as separate components on an outer face or inner face of the cladding part 3.

LIST OF REFERENCE NUMERALS

1 Safety belt
10, 11 Belt portion
2 Adjusting apparatus
20 Belt guiding element
21 Belt strap outlet
3 Cladding part
4, 4.1, 4.2 Lower sensor element
5, 5.1, 5.2 Lower sensor element
6, 6.1, 6.2 Upper sensor element
7, 7.1, 7.2 Upper sensor element
AE Drive unit
B B-pillar
D Roof
d1, d2 Spacing (horizontal)
F Vehicle seat
h1, h2, h3 Spacing (vertical)
I Vehicle occupant
K Headrest
R Backrest
SE Control electronics unit
V1, V2 Direction of adjustment
α Angle
β Angle of inclination

The invention claimed is:

1. A method for setting a safety belt in a vehicle, wherein for the adjustment of the safety belt an adjusting apparatus is provided, the position of a deflection point for the safety belt being able to be set thereby and the safety belt extending therefrom in the direction of the shoulder of a vehicle occupant fastened-in by the safety belt, the method comprising:
    automatically setting the position of the deflection point via at least one sensor device in order to adapt the path of the safety belt to the fastened-in vehicle occupant, and
    evaluating, via the at least one sensor device, an angle which is present between
        a belt portion which extends from the deflection point in the direction of the shoulder of the fastened-in vehicle occupant, and
        a further belt portion and/or a part fixed to a bodywork or seat part,
    in order to set automatically an adjusted position of the deflection point adapted to the fastened-in vehicle occupant via the adjusting apparatus,
    wherein an evaluation of the angle and thus an automatic setting of the deflection point only takes place upon at least one detected operating event.

2. The method as claimed in claim 1, wherein the further belt portion extends from a fastening point of the safety belt to the deflection point.

3. The method as claimed in claim 1, wherein a height of the deflection point in the region of the shoulder of a fastened-in vehicle occupant is set via the sensor device, in order to adapt automatically the path of the safety belt to a size and/or seating position of the vehicle occupant.

4. The method as claimed in claim 1, wherein an adjustment of the deflection point takes place until the evaluated angle is in a predetermined angular range.

5. The method as claimed in claim 4, wherein an evaluation as to whether the evaluated angle is in the predetermined angular range is undertaken during and/or after the completion of an adjustment of the deflection point.

6. The method as claimed in claim 4, wherein a signal is produced for providing an acoustic and/or visual information to the vehicle occupant when the evaluated angle is in the predetermined angular range.

7. The method as claimed in claim 1, wherein for evaluating the angle via at least one sensor element of the sensor device, at least one spacing is detected between the belt portion extending from the deflection point in the direction of the shoulder of the fastened-in vehicle occupant and
   the further belt portion,
   the part fastened to the bodywork or seat part, and/or
   the at least one sensor element.

8. The method as claimed in claim 1, wherein an evaluation of the angle and thus an automatic setting of the deflection point takes place after the insertion of an insertion tongue of the safety belt into a belt buckle and/or the starting of an engine of the vehicle has been detected.

9. A method for setting a safety belt in a vehicle, wherein
   for the adjustment of the safety belt an adjusting apparatus is provided, the position of a deflection point for the safety belt being able to be set thereby and the safety belt extending therefrom in the direction of the shoulder of a vehicle occupant fastened-in by the safety belt, the method comprising
   automatically setting the position of the deflection point via at least one sensor device in order to adapt the path of the safety belt to the fastened-in vehicle occupant, and
   evaluating, via the at least one sensor device, an angle which is present between
      a belt portion which extends from the deflection point in the direction of the shoulder of the fastened-in vehicle occupant, and
      a further belt portion and/or a part fixed to a bodywork or seat part,
   in order to set automatically an adjusted position of the deflection point adapted to the fastened-in vehicle occupant via the adjusting apparatus,
   wherein an evaluation of the angle and thus an automatic setting of the deflection point is automatically repeated after a predefined time period has passed.

10. An adjusting apparatus for a safety belt in a vehicle, the adjusting apparatus comprising:
   at least one adjustable belt guiding element for defining a deflection point, the safety belt extending therefrom in the direction of the shoulder of a vehicle occupant fastened-in by the safety belt; and
   a sensor device, an adjusted position of the belt guiding element being able to be automatically set thereby in order to adapt the path of the safety belt to the fastened-in vehicle occupant,
   wherein via the sensor device an angle is able to be evaluated which is present between
      a belt portion which extends from the deflection point in the direction of the shoulder of the fastened-in vehicle occupant, and
      a further belt portion and/or a part fastened to a bodywork and/or a seat part,
   in order to predetermine an adjusted position for the adjustable belt guiding element adapted to the fastened-in vehicle occupant,
   wherein at least two sensor elements arranged adjacent to one another and/or above one another relative to a vehicle vertical axis are provided in order to detect in each case a spacing.

11. The adjusting apparatus as claimed in claim 10, wherein the sensor device for evaluating the angle comprises at least one sensor element for detecting a spacing between the belt portion extending from the deflection point in the direction of the shoulder of the fastened-in vehicle occupant and
   the further belt portion,
   the part fixed to the bodywork or seat part, and/or
   at least one sensor element of the at least two sensor elements.

12. The adjusting apparatus as claimed in claim 10, wherein the at least two sensor elements in each case are arranged above the deflection point in order to detect in each case a spacing relative to the upper face of the belt portion.

13. The adjusting apparatus as claimed in claim 10, wherein the at least two sensor elements in each case are arranged below the deflection point, in order to detect in each case a spacing relative to the lower face of the belt portion.

14. The adjusting apparatus as claimed in claim 10, wherein the at least one sensor element of the sensor device is provided on the belt guiding element and/or a cladding part, the belt guiding element being adjustable relative thereto.

15. The adjusting apparatus as claimed in claim 14, wherein the at least one sensor element is embedded in the material of the belt guiding element or of the cladding part.

16. An adjusting apparatus for a safety belt in a vehicle, the adjusting apparatus comprising:
   at least one adjustable belt guiding element for defining a deflection point, the safety belt extending therefrom in the direction of the shoulder of a vehicle occupant fastened in by the safety belt, and
   a sensor device, an adjusted position of the belt guiding element being able to be automatically set thereby in order to adapt the path of the safety belt to the fastened-in vehicle occupant,
   wherein via the sensor device an angle is able to be evaluated which is present between
      a belt portion which extends from the deflection point in the direction of the shoulder of the fastened-in vehicle occupant, and
      a further belt portion and/or a part fastened to a bodywork and/or a seat part,
   in order to predetermine an adjusted position for the adjustable belt guiding element which adapted to the fastened-in vehicle occupant,
   wherein at least one sensor element of the sensor device is arranged so as to be inclined relative to the vertical.

* * * * *